(12) United States Patent
Vellandi

(10) Patent No.: US 6,385,614 B1
(45) Date of Patent: *May 7, 2002

(54) ELECTRONIC BOOKSHELF WITH MULTI-USER FEATURES

(75) Inventor: Henry P. Vellandi, Boulder, CO (US)

(73) Assignee: netLibrary Inc., Boulder, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,815

(22) Filed: Jan. 14, 1998

(51) Int. Cl.⁷ ............................ G06F 7/00; G06F 17/30; H04L 9/00; H04K 1/00
(52) U.S. Cl. ............................ 707/9; 713/185; 713/168
(58) Field of Search .............. 380/3, 4, 49; 395/200.49, 395/200.55, 200.56, 200.59, 726, 728; 707/9; 713/185, 168

(56) References Cited

U.S. PATENT DOCUMENTS

| | | | |
|---|---|---|---|
| 5,113,518 A | | 5/1992 | Durst, Jr. et al. ............ 395/550 |
| 5,276,901 A | * | 1/1994 | Howell et al. |
| 5,357,631 A | * | 10/1994 | Howell et al. ............... 707/203 |
| 5,649,185 A | * | 7/1997 | Antognini et al. ............. 707/9 |
| 5,664,196 A | | 9/1997 | Hecker ........................ 395/726 |
| 5,699,428 A | | 12/1997 | McDonnal et al. ............ 380/4 |
| 5,717,604 A | | 2/1998 | Wiggins ................. 364/514 C |
| 5,757,907 A | | 5/1998 | Cooper et al. ................. 380/4 |
| 5,802,518 A | | 9/1998 | Karaev et al. ................. 707/9 |
| 5,825,876 A | | 10/1998 | Peterson, Jr. .................. 380/4 |
| 5,903,904 A | * | 5/1999 | Peairs ........................ 707/526 |
| 6,006,332 A | * | 12/1999 | Rabne et al. ............... 713/201 |

* cited by examiner

*Primary Examiner*—Gail Hayes
*Assistant Examiner*—Douglas J. Meislahn
(74) *Attorney, Agent, or Firm*—Holme Roberts & Owen LLP; Christopher J. Kulish

(57) ABSTRACT

The present invention relates to electronic books that are accessed over a computer network, such as the Internet. One embodiment of the invention relates to a shared electronic book, i.e. a book in which multiple users each have the right to access the book but only one of the users is allowed to actually access the book at a given point in time. Another embodiment of the invention relates to the detection of potentially fraudulent access of an electronic book. Yet a further embodiment of the invention is concerned with preventing electronic copying of an electronic book when the book is provided to users over an intranet that is not under the direct control of the provider of the electronic book.

17 Claims, 6 Drawing Sheets

ELECTRONIC BOOKSHELF WITH MULTI-USER FEATURES

FIELD OF THE INVENTION

The present invention relates to electronic books that are transmitted over a network, such as the Internet, to a user's personal computer or work station.

BACKGROUND OF THE INVENTION

Presently, an individual with a personal computer can access web sites on the Internet of book stores. At such a web site, a user can search for a particular book or type of book, view a selection of books that meet the user's search criteria, and order a copy of one or more books that are identified in the searching process, which are then sent to the user's address. This type of system works well for consumer oriented books. However, this system does not work well for books that are frequently updated. Examples of frequently updated books include the reference books that are used in the legal, banking and insurance industries. These books are periodically updated to reflect changes in the laws that govern these industries. For these types of books, web sites have evolved that allow a customer to take out a subscription on a book of interest. The customer can then access the most recent edition of this book from the web site and view selected pages of the book on their personal computer or workstation. Books that are accessed in this fashion are typically referred to as "electronic" books.

SUMMARY OF THE INVENTION

The present invention is directed to a problem that was identified with respect to the current systems that allow customers to subscribe to "electronic" books. The problem involved the need for several individuals in an organization to have access to a particular electronic book. Under the prior subscription system, this need required the organization to purchase a separate subscription for each individual that required access to the particular book. As a consequence, each individual with a subscription was able to access their own individual copy of the book at any time.

The present invention recognizes that in many situations not all of the individuals in an organization need to have unlimited access to the book, i.e. be able to access the book at any time, and addresses these situations by providing several individuals with the right to access an electronic book but limiting the actual access of the book to one individual at a time. In other words, the invention provides an electronic book that can be shared by a number of users.

The present invention addresses a number of problems associated with providing shared access to an electronic book. In providing shared access to an electronic book over the Internet or an intranet, it was recognized that there is no provision for determining when an individual's exclusive access to or use of an electronic book has terminated or should be considered to have terminated. Without the ability to determine if termination has occurred or to effect termination, the book cannot be provided to other users that have a right to access the book. Further, while it is possible to provide a mechanism that permits the user to explicitly release the book so that the book can be used by others, such a mechanism is unreliable because it depends on the user to execute the release. The present invention address this problem by making use of a "cookie", i.e. a temporary identifier that is assigned to a user when the user accesses a web site and is used in communications between the user and the web server. The "cookie" is part of the WorldWideWeb/Internet protocol and was included in the protocol to provide a web server with the ability to keep track of the "state" of communications between the web server and all of the users that are accessing the web server. In essence, the "cookie" is a unique, temporary identifier that is assigned to each user that is accessing a web server. In contrast to the "state" tracking use of the "cookie", the present invention makes use of the "cookie" mechanism to terminate a user's exclusive use of a book, thereby permitting other users to access the book. To elaborate, upon accessing the web server on which the shared electronic book is located, a user is assigned a "cookie" for use in subsequent communications with the web server. The user is then able to request access to a shared electronic book. If the shared electronic book is available, the user is granted exclusive access to the book for a predetermined period of time. Each request that the user transmits to the web server with respect to the book during this predetermined period of time is accompanied by the "cookie" assigned to the user. If the web server does not see the "cookie" assigned to the user accompanying a request with respect the book to which the user has been granted exclusive access within the predetermined period of time or some portion thereof, the user's exclusive access to the shared electronic book is terminated upon expiration of the predetermined period of time. At this point, the book is again available to all users that have a right to access the book.

To facilitate termination of a particular user's exclusive access to a shared electronic book when the user only needs to refer to the book quickly and for a brief period of time, and thereby make the book available to the other users, one embodiment of the invention involves releasing the book from a particular user upon expiration of the predetermined period of time if the "cookie" and associated request relating to the book are not received within a portion of the predetermined period of time that commences after the predetermined period of time starts. For example, a particular user is granted exclusive access to a shared book for 30 minutes and the noted portion of the 30 minute period is defined to be the last 15 minutes of the 30 minute period. If a "cookie" relating to the book is not seen in the last 15 minutes of the 30 minute period, the user's access to the book is terminated upon expiration of the 30 minute period, even if a "cookie" was seen in the first 15 minutes of the 30 minute period. This assures that when a user that has been granted exclusive access to a book only needs to access the book quickly and for a short period of time, other users are not foreclosed from obtaining access to the shared book for an extended period of time.

In another embodiment, a user is able to renew or extend the period of time during which they have exclusive access to a shared electronic book. Again, the user is granted exclusive access to a shared electronic book for a predetermined period of time. If a "cookie" and associated request relating to the book are seen during the predetermined period of time, the user is granted a further period of exclusive access to the book. For example, if the user is initially granted a 30 minute period of exclusive access to a book and a "cookie" with an associated request relating to the book is seen by the web server during this 30 minute period, the user is granted a further period of exclusive access to the book.

A further embodiment addresses the concerns of (1) providing a user that has been granted exclusive access to a shared electronic book with the ability to renew or extend the period during which they have exclusive access to the book and (2) not foreclosing other users from having access to a shared electronic book when a user that has been granted exclusive access to a book only needs to refer to the book quickly and for a short period of time. This embodiment of the invention only renews or extends a user's exclusive access to a shared book if a "cookie" and associated request relating to the book are received during a portion of the predetermined period of time that commences after the predetermined period of time commences. To continue with the prior example, if a "cookie" and associated request relating to the book are seen in the last 15 minutes of the 30 minute period, the period of exclusive access is extended for a further period of time. If, on the other hand, "cookie" and associated request relating to the book are not seen in the last 15 minutes of the 30 minute period, the book is released. This release occurs even if a "cookie" and associated request relating to the book are seen in the first 15 minutes of the 30 minute period.

To address the possibility of a user being able to continually renew their exclusive access to a shared book so that the ability of the other users to access the book is undesirably inhibited, another embodiment reduces the length of the renewal periods as the number of renewals increases. In an alternative embodiment, the number of "cookies" and associated requests that must be seen during the period when a user has exclusive access to a share book in order to obtain a renewal is increased as the number of renewals increases. In a further embodiment, users are pre-assigned a priority code. If a user requests a book and is denied access because another user with a lower priority has exclusive access, the user with the lower priority will not be granted a renewal, and at the point that the book again becomes available, the user with the higher priority is granted exclusive access to the book for a period of time. In yet a further embodiment, if a user has been granted exclusive access to a book and some predetermined number of other users have requested access to the book and been denied access during the user's exclusive access period, the user will not be granted a renewal. When the user's exclusive access period expires and the book will then become available to the other users.

Another problem that is related to providing shared access to an electronic book and the type of access in a which a user can access their own copy of a particular electronic book at any time is the misappropriation or unauthorized sharing an authorized user's password and the subsequent use of the password to obtain unauthorized access to an electronic book. The present invention addresses this problem in the Internet/intranet situation by making use of the "cookie" to identify situations in which it is likely that one or more individuals are fraudulently obtaining access to a particular electronic book. It should be appreciated that at the point in the process during which "cookies" are issued it is difficult to distinguish the situation in which an authorized user is alternately accessing an electronic book from two different computers and the situation in which two different users, at least one of which is an unauthorized user, are accessing the electronic book. Consequently, if two individuals at two different personal computers or work stations are using an authorized user's password to access an electronic book, each user will be issued a unique "cookie". For example, the first user at the first personal computer will be issued "cookie01" and the second user at the second personal computer will be issued "cookie02". As previously noted, a "cookie" accompanies each communication from a user to the web server. The present invention looks for a pattern in the timing of the two unique "cookies" or, stated differently, at the timing of the communications coming from the first and second personal computers to identify situations in which it is likely that at two different individuals are using a single authorized user's password to access an electronic book.

In one embodiment, it is assumed that two communications containing a particular "cookie" define the endpoints of a period of time during which a first individual is accessing one or more electronic books. If the periods of time associated with the two unique cookies that have been issued to what appears to be a single authorized user overlap, then this is considered to be indicative of the situation where an unauthorized user is obtaining access to a particular electronic book. For example, if (1) "cookie01" is first received at time "t1" and later received at time "t2"; (2) "cookie02" is first received at time "t3" and later received at time "t4"; (3) time "t3" occurs between times "t1" and "t2"; and (4) time "t4" is later than time "t2", then there is an overlap that is indicative of fraud. In certain situations, however, such an overlap can still be associated with the situation in which a single authorized user is alternately using two different computers to access one or more books. To address this situation, a further constraint is used that the overlap happen over a relatively short period of time during which it is unlikely that a single authorized user is alternatingly using two different computers. To continue with the example, if the difference between times "t2" and "t3" is less than a predetermined period of time and there is an overlap, fraud is presumed.

In another embodiment, the time at which the two different "cookies" are received is combined with information related to the distance between personal computers with fixed locations to identify a situation in which fraud is likely to be occurring. To elaborate, this embodiment is based upon the assumption that fraud is likely to be occurring when the difference in times of the two unique "cookies" that define the endpoints of the overlap is less than the time it would reasonably take for the authorized user to travel between the locations of the two computers. To continue with the prior example, if the difference between times "t2" and "t3" is less than the time it would reasonably take for an individual to travel between the fixed locations of the first and second personal computers, then it is likely that an unauthorized individual is accessing the electronic book.

Another problem that is addressed by the present invention involves the situation in which an organization has purchased two or more separate subscriptions to the same electronic book for individuals within the organization and the book is available to the users over an intranet rather than the Internet. An intranet is essentially a localized version of the Internet in which an organization has a web server, a number of personal computers that each has a web browser, and a network for conducting communications between the web server and the personal computers. In the intranet situation, the electronic book is located on the organization's web server and therefore out of the direct control of the provider of the book. In this case, it is necessary to make it difficult for the electronic book to be electronically copied.

The present invention addresses this problem by encrypting the electronic book and only decrypting the pages or portions of the electronic book for as long as it takes to service all of the requests for access to pages or portions of the book. Once all of the requests have been serviced, the pages of portions of the electronic book that have decrypted are then re-encrypted. With this protection scheme, unauthorized electronic copying of the electronic book becomes difficult and if possible, likely to be quite expensive.

DETAILED DESCRIPTION

Figure 1:
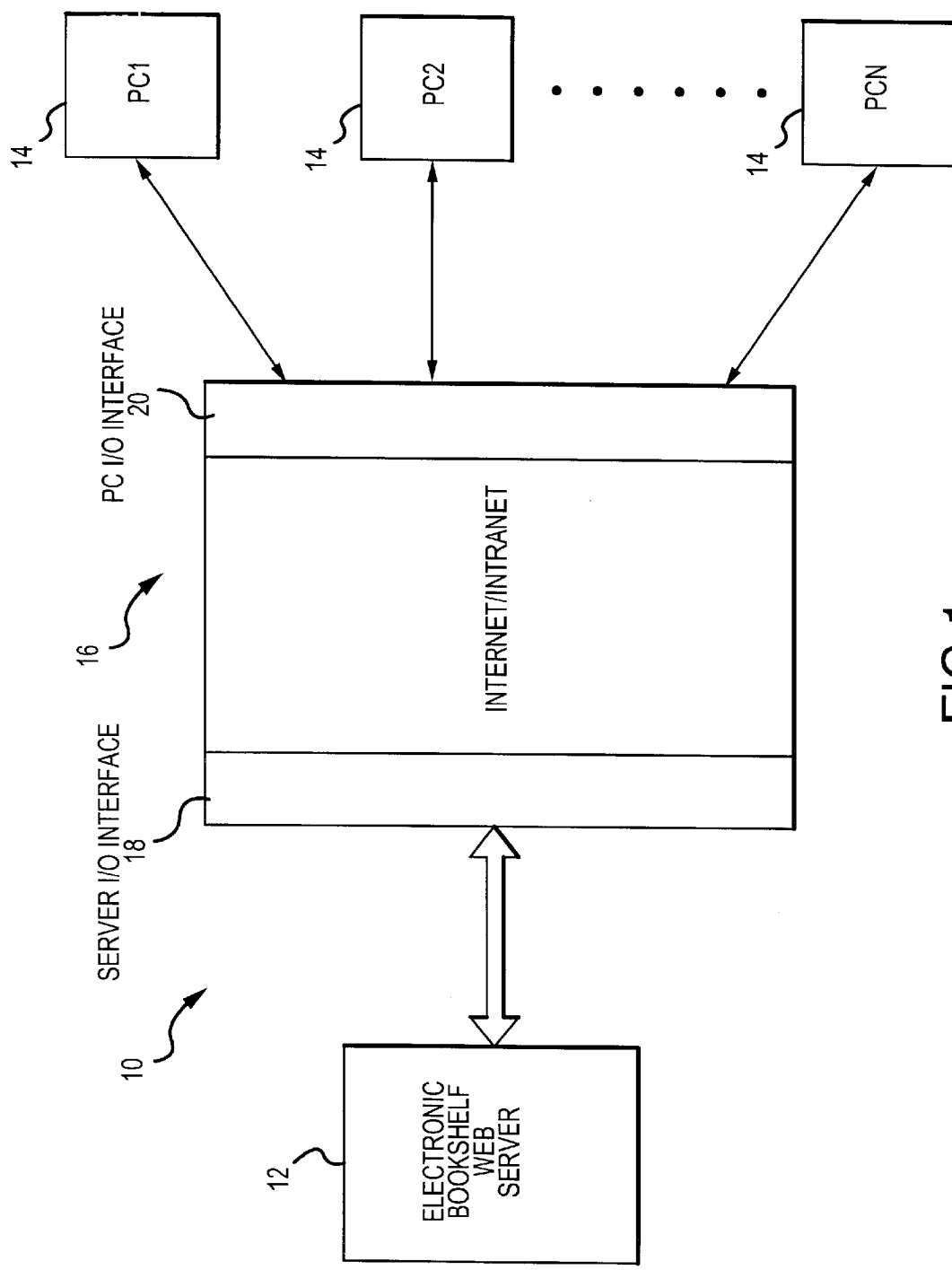
FIG. 1 is a block diagram of a web server, a plurality of personal computers or work stations that each has a web browser, and the Internet/internet for conveying communications between each of the plurality of personal computers and the web browser.

FIG. 1 generally illustrates a computer network system for providing electronic books to a plurality of subscriber's computers or computer terminals, which is hereinafter referred to as system 10. The system 10 includes an electronic book web server 12, a plurality of subscriber computers or computer terminals 14, and an Internet system 16 for conveying communications between the server 12 and each of the subscriber computers 14. The electronic book web server 12 includes or has access to the electronic books that are provided to the subscriber computers 14 via the Internet. In addition, the server 12 has software for managing the communications with the subscriber computers 14. The subscriber computers 14 can be personal computers, work stations, web televisions or any other type of machine that is capable of communicating with the server 12. Generally, the subscriber computers 14 each include a web browser, a monitor and some kind of input device, like a keyboard or mouse. In addition, the subscriber computers 14 are each equipped with software for use in viewing the electronic books provided by the server 12. The Internet systems 16 includes a server I/O interface 18 for facilitating communications from the subscriber computers 14 to the server 12 and from the server 12 to the subscriber computers 14. Likewise, a subscriber I/O interface 20 conveys communications from the server 12 to the subscriber computers 14 and from the subscriber computers 14 to the server 12. Generally, the function of the server I/O interface 18 and/or the subscriber I/O interface 20 is provided by an internet server provider (ISP). The Internet system 16 operates on a number of different levels. The level presently being used to communicate electronic book related information is the World Wide Web (www).

The World Wide Web operates according to a predetermined protocol. Part of this protocol is what is termed a "cookie." A cookie is a unique identifier that is assigned to a computer when the computer initially accesses a web server. The cookie permits the web server to keep track of the state of communications between the server and the computer in subsequent communications.

Figure 2A:
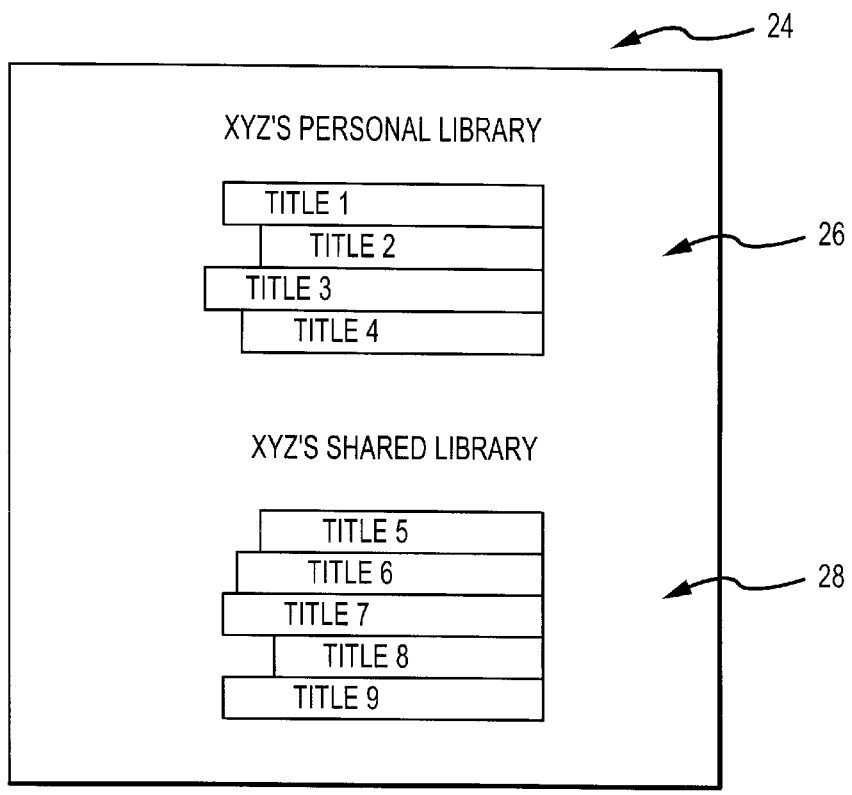
FIG. 2A shows the display, as seen on a subscriber's monitor, of the subscriber's personal "bookshelf" and the subscriber's shared "bookshelf"

FIG. 2A illustrates a library display 24 that is typically seen on the monitor of a subscriber computer 14 after a subscriber obtains access to the server 12. The display 24 includes a personal library portion 26 that shows all of the electronic books that the subscriber can access at any time, i.e. does not share with another subscriber. Also part of the display 24 is a shared library portion 28 that illustrates all of the electronic books that the subscriber shares with other subscribers, i.e. has the right to access but cannot access at the same time as another subscriber is accessing the book.

Figure 2B:
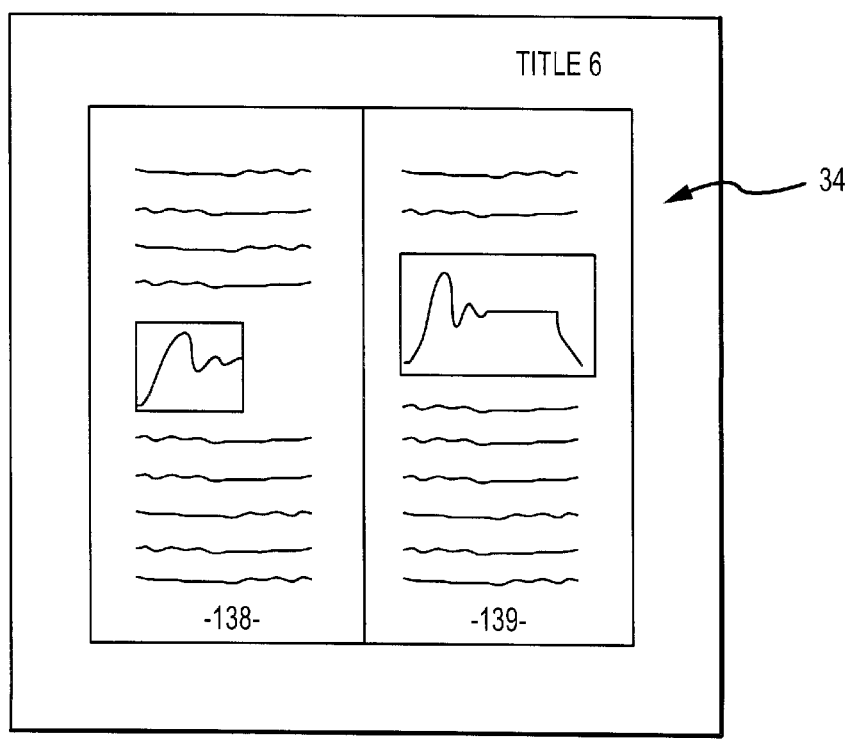
FIG. 2B shows the display, as seen on a subscriber's monitor, of two pages of one of the books from the subscriber's shared bookshelf.

FIG. 2B illustrates an electronic book display 32 that is typically seen on the monitor of the subscriber computer 14 after the subscriber has selected a book for viewing from either the personal library portion 26 or the shared library portion 28 of the library display 24. The book display includes a page display 34 that shows one or more pages of the selected book.

Figure 3:
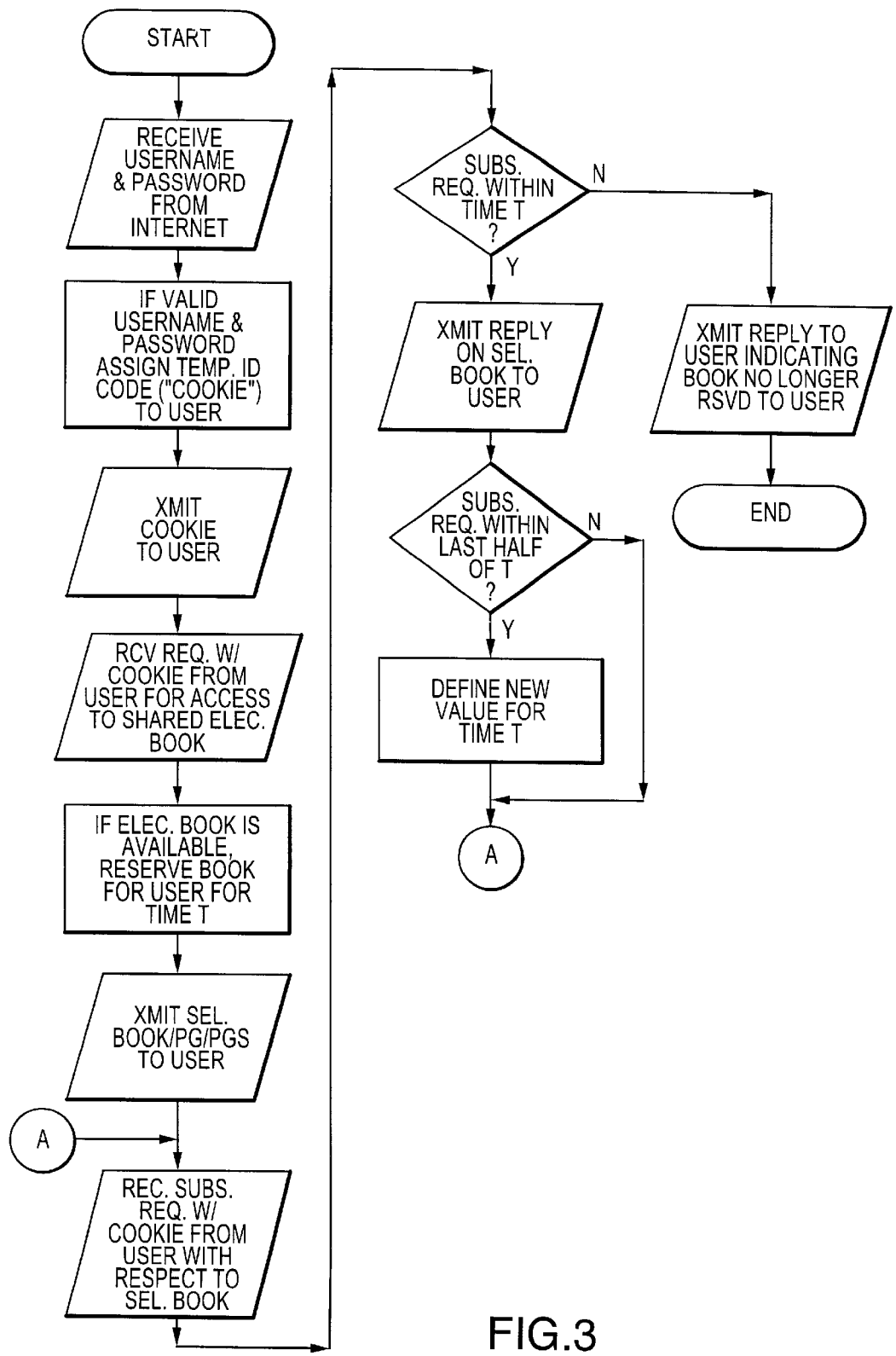
FIG. 3 is a flowchart of the decision process performed in the electronic bookshelf web server to assure that a shared electronic book that is reserved for a particular user will become available to other users that have the right to access the shared book under certain circumstances and to assure that a user can extend their period of exclusive use of the shared electronic book under certain circumstances.

With reference to FIG. 3, the operation of the web server 12 is discussed with respect to the situation in which several subscribers share a particular electronic book. In particular, the communications between the server 12 and subscriber computer 14 that relate to (1) termination of a subscriber's exclusive access to an electronic book so that the other subscribers that have the right to access the book have an opportunity to do so; and (2) the ability of a subscriber to renew or continue their exclusive access to a book. Initially, the subscriber must obtain access to the server 12. This is accomplished by using the Internet system 16 to transmit a username and password from a subscriber computer 14 to the server 12. If the username and password are valid, the server 12 assigns a "cookie" (unique id) to the subscriber and transmits the cookie to the subscriber computer 14 via the internet system 16. Subsequently, the subscriber uses the subscriber computer 14 to communicates a request, which includes the cookie, to the server 12 for access to a particular shared book. If the book is available, i.e. not presently allocated to another subscriber, the server 12 conveys a message to the subscriber computer 14 via the Internet system 16 that the subscriber has been granted exclusive access to the book. Subsequently, the subscriber user the subscriber computer 14 to submit requests to the server 12 that particular pages of the selected book be sent to the subscriber computer 14.

The subsequent requests, which each include the cookie assigned to the subscriber computer 14, are analyzed by the server 12 for determining whether or not to terminate the subscriber's exclusive access to the book and for determining whether or not to extend the period of the subscriber's exclusive access. To elaborate, when the server 12 initially grants the subscriber exclusive access to the book, the subscriber is only granted a predetermined period of exclusive access. For example, the server 12 may grant the subscriber a 30 minute period of exclusive access to the selected book. If the server 12 does not receive a request with the noted cookie from the user within this predetermined period of time, the server 12 revokes the subscribers exclusive access to the book, thereby making the book available to other subscribers.

To facilitate termination of a particular subscriber's exclusive access to a book when the subscriber only needs to access the book for quick and brief period of time, the subsequent requests transmitted from the subscriber computer 14 to the server 12 via the Internet system 16 are further analyzed. Specifically, if the server 12 does not receive a subsequent request from the subscriber computer 14 within the later portion of the period of time during which the subscriber has exclusive access to the book, the server 12 terminates the subscriber's exclusive access to the book upon expiration of the predetermined period.

In many cases, the subscriber needs to make use of the selected book for more than the predetermined period of time. In such situations, it is desirable to provide a mechanism for the subscriber to extend the period during which they have exclusive access to the book. As shown in FIG. 3, if the server 12 receives a subsequent request from the subscriber within the predetermined time that the subscriber has been granted exclusive access, the subscriber's period of exclusive access is extended. To accommodate the need to terminate the subscriber's exclusive privilege when the subscriber only needs to view the book for a quick and brief period of time and the need to extend the period of exclusive access to the book, the server 12 operates so as to only extend the period of exclusive access if a subsequent request from the subscriber is received within the later portion of the predetermined period of exclusive access.

To address the possibility that a subscriber is obtaining an inordinate number of extensions to their period of exclusive access, the conditions under which the server 12 grants extensions are modified. For example, the server 12 can require that more requests be received and/or the reduce the period of time when one or more requests must be received to obtain an extension. Alternatively, the server 12 can reduce the period of an extension as the number of extensions increases. A further alternative is to pre-assign users a priority code. The server 12 then uses this priority to determine whether or not to renew a user's exclusive access to a book Specifically, the server 12 will not renew a lower priority user's exclusive access if a higher priority user has requested exclusive access to the book during the lower priority user's period of exclusive access to the book. Another method that the server 12 can utilize to address this problem is to deny renewal of a user's exclusive access to a book if a predetermined number of other users have requested access to the book during the user's period of exclusive access.

While the server 12 has been described as monitoring the period that a subscriber has exclusive access period to a book or portion thereof, another embodiment of the system 10 downloads both the book or a portion of the book and the viewing software to the subscriber computer 14. In this embodiment, the viewing software monitors the period or periods of exclusive access to the book that are accorded to the subscriber as previously described. Specifically, the viewing software disallows viewing of the book or portion of the book that has been downloaded onto the subscriber computer 14 if the subscriber explicitly terminates exclusive access to the book or the period of exclusive access has expired. In the situation in which the subscriber explicity terminates exclusive access, the viewing software establishes a communication link with the server 12 via the Internet 16 and then informs the server 12 that the subscriber has terminated their exclusive access to the book. Expiration of the period of exclusive access is monitored by both the server 12 and the viewing software. The server 12, upon detecting expiration of the exclusive access period, makes the book available to other subscribers. The viewing software, upon detecting expiration of the exclusive access period, prevents the subscriber from viewing the downloaded book or portion thereof.

The conditions under which a subscriber's exclusive access is renewed are the same as described hereinabove. However, the manner in which renewal occurs involves the viewing software establishing a communication between the subscriber computer 14 to the server 12 via the Internet 16 and then communicating with the server 12 concerning renewal of the subscriber's exclusive access to the book. For example, the server 12 may have determined that a higher priority user is waiting to access the book and inform the subscriber computer 14 that the renewal is being denied. In this case, the viewing software operates to disallow viewing of the relevant book just as if the subscribers period of exclusive access had expired.

Figure 4:
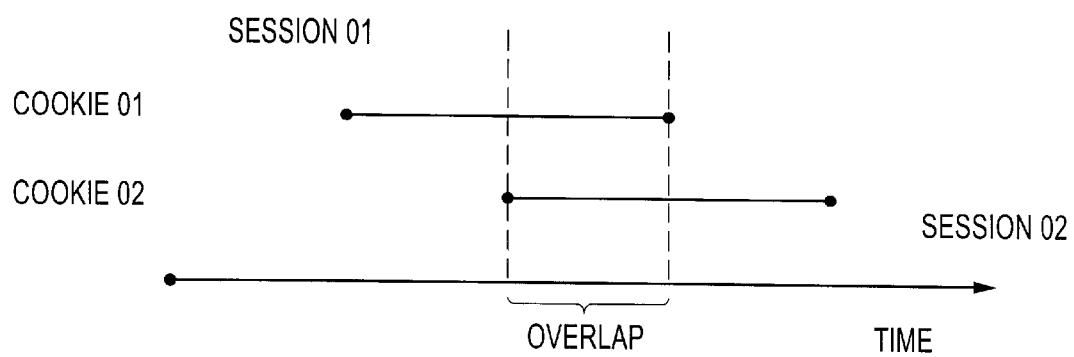
FIG. 4 illustrates an overlap in the pattern in which two "cookies" are being used that is indicative of someone obtaining fraudulent access to the electronic books.
Figure 5:
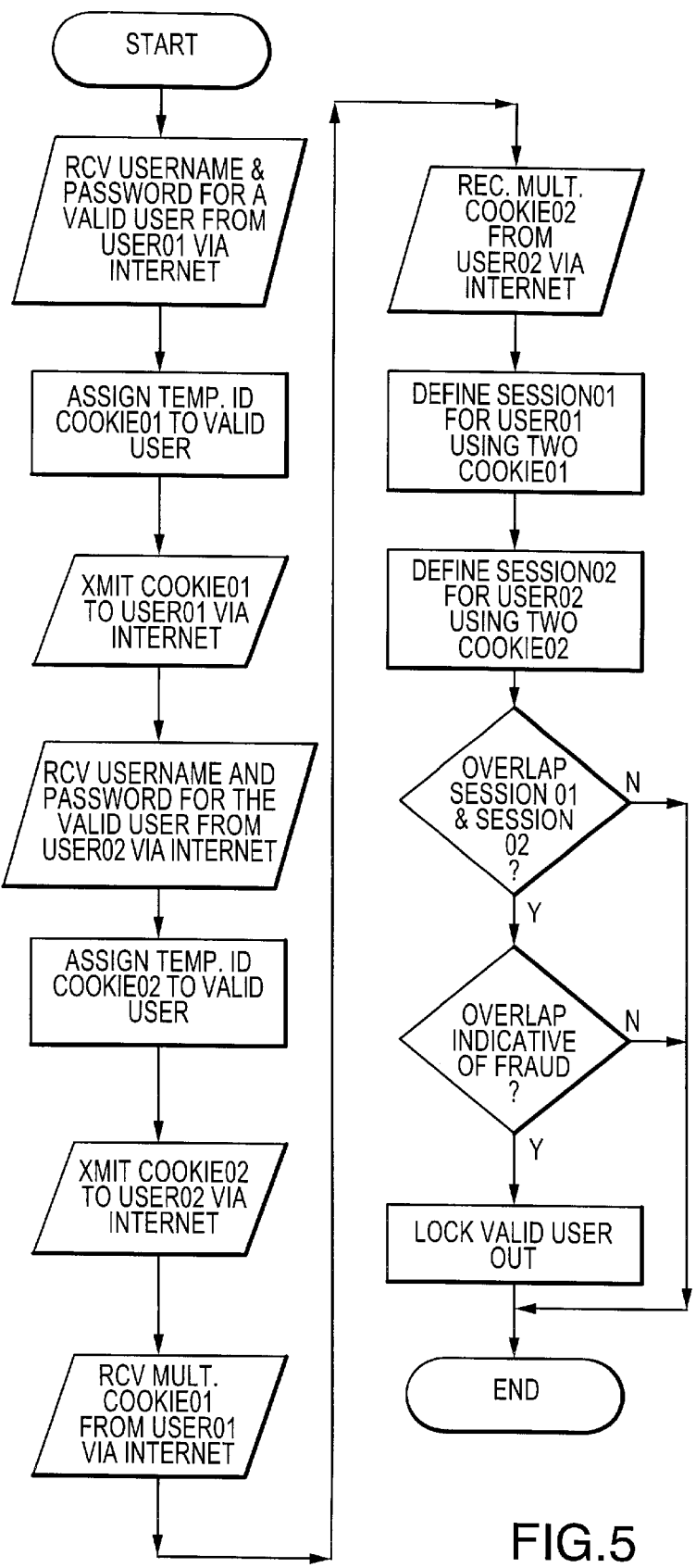
FIG. 5 is a flowchart of the events that occur in identifying unauthorized access to the electronic bookshelf by an unauthorized individual who has obtained the username and password of an authorized user.

With reference to FIGS. 4 and 5, the present invention also addresses the problem of one or more persons obtaining the information, such as a password, that an authorized subscriber uses to access the server 12 and using this information to obtain unauthorized access to electronic books provided by the server 12. The server 12 addresses this problem by again making use of the cookies received from two subscriber computers 14 where the individual or individuals associated with the subscriber computers 14 obtained access to the server 12 using a valid subscriber's access information. Specifically, the server 12 looks for a pattern in the cookies received from the two subscriber computers 14 that is indicative of fraud. With particular reference to FIGS. 4 and 5, when one or more individuals uses two different subscriber computers 14 to obtain access to the server 12, the two subscriber computers 14 are each assigned a unique cookie for the subsequent communications. For example, one of the subscriber computers 14 could be assigned "cookie01" and the other subscriber computer 14 could be assigned "cookie02". The server 12 looks for a pattern in these two unique cookies that is indicative of fraud. Specifically, the server 12 defines a session for the first subscriber computer 14 as the time between the receipt of two consecutive cookies. Likewise, a session for the second subscriber computer 14 is defined by the server 12 to be the time between two consecutive cookies. If there is an overlap in the two sessions, the server 12 presumes that someone is fraudulently accessing the server 12. In this case, the valid subscriber is prevented from accessing the server 12 to view books. Typically, all requests for access that are associated with the suspect password are denied for a specified period of time, after which the user that is the owner of the suspect password is asked/required to change their password. To avoid locking out a valid subscriber that is using two subscriber computers 14 to access the server 12, the period of overlap that the server 12 uses to make a determination that fraud is likely to be occurring is relatively narrow. For example, the overlap needed for the server 12 to take remedial action may be 5 minutes or less. A possible refinement to the overlap period having to be less than a predetermined period of time in order for the server 12 to conclude the one or more individuals is likely to be fraudulently accessing the server 12 is possible if the locations of the two subscriber computers 14 are fixed. In this case, fraud would be indicated if the overlap period is less than the time it would reasonably take for an individual to travel between the fixed locations of the two subscriber computers 14.

Figure 6A:
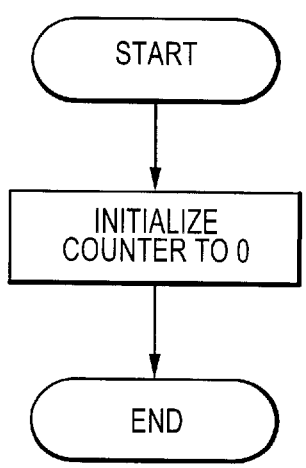
FIGS. 6A and 6B are flowcharts illustrating the steps used to deter copying of an electronic book that is provided to subscribers over an intranet.
Figure 6B:
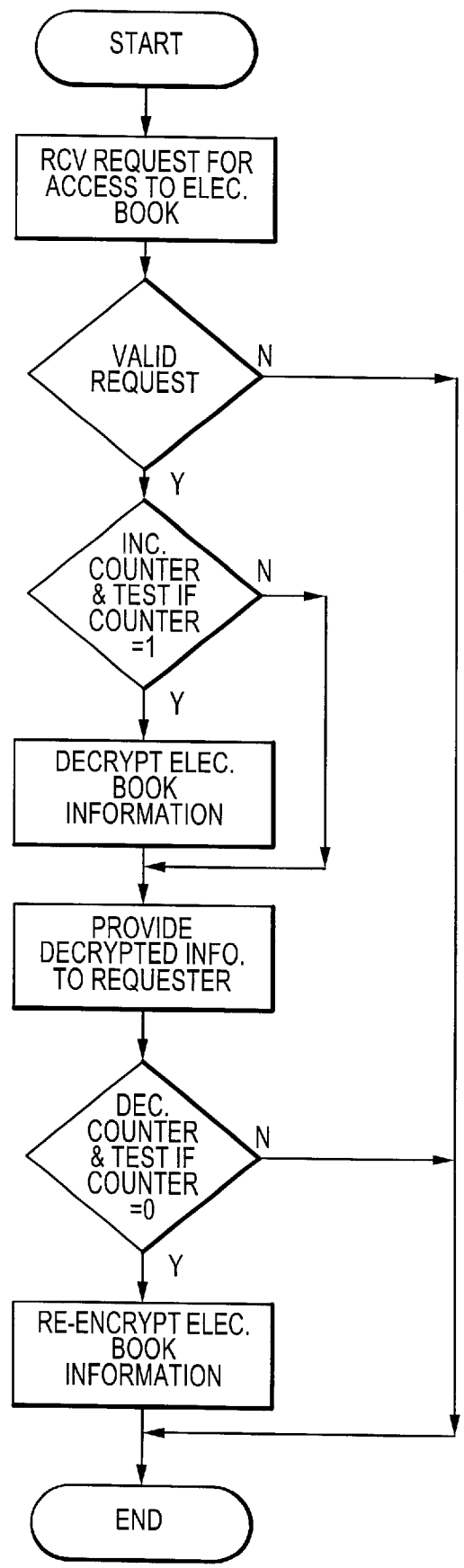

With reference to FIG. 6, the present invention also addresses the problem of unauthorized copying of the electronic books when the system is implemented in an intranet or local network environment in which the provider of the electronic book does not have direct control over the access to the electronic books. In this situation, copying is deterred by encrypting the electronic books and decrypting an electronic book or portion thereof only for the period of time during which there are pending requests for access to the book. Once there are no requests for access to the electronic book, the book or portion thereof is re-encrypted. With reference to FIG. 6A, this methodology is implemented by initializing a counter to 0 in the server 12 before any requests for access to a particular electronic book are serviced. The counter is used to keep track of requests that are potentially being simultaneously processed by multiple versions or threads of the process illustrated in FIG. 6B. It should also be appreciated that because the counter provides this tracking function, operations involving the counter, such as incrementing and decrementing the counter, are atomic, i.e. cannot be interrupted.

With reference to FIG. 6B, each request for access to a particular electronic book cause a separate thread or version of the illustrated process to commence. Initially, the validity of the request is tested by assessing whether the requesting subscriber has the right to access the book. If the request is invalid, the process terminates. If, on the other hand, the request is valid, the counter is incremented and tested to determine if the counter is equal to one. When the counter is first incremented, i.e. goes from a value of 0 to a value of 1, the electronic book or relevant portion of the book are decrypted and provided to the first subscriber that submitted a request. After the decrypted electronic book or portion of the book has been provided to a first requesting subscriber, the counter is decremented. If there are other outstanding requests for access to the relevant portion of the book (i.e. if the counter is still greater than 0) after the first requesting subscriber has been serviced, the decrypted book or portion of the book is provided to the next requesting subscriber by a second active version of the illustrated process and so on in FIFO order until all the requests have been serviced. Once all the requests have been serviced (i.e. the counter has been decremented such that it is now equal to 0), the last active version of the illustrated process causes the book or relevant portion of the book to be re-encrypted, thereby making it difficult for someone to make unauthorized copies of the electronic book. To further deter copying, the book is encoded with the server's domain name, and decryption is allowed only on the server whose domain name matches the domain name encoded in the book.

The foregoing description of the invention has been presented for purposes of illustration and description. Further, the description is not intended to limit the invention to the form disclosed herein. Consequently, variations and modifications commensurate with the above teachings, and the skill or knowledge in the relevant art are within the scope of the present invention. For example, the inventions are applicable to the Internet, an intranet and other computer networks. Moreover, the inventions, while described with respect to electronic books, are also applicable to other types of read-only data. It should also be appreciated that steps of the various inventions can, in many instances, be performed in different sequences from those described. The preferred embodiment described hereinabove is further intended to explain the best mode known of practicing the invention and to enable others skilled in the art to utilize the invention in various embodiments and with the various modifications required by their particular applications or uses of the invention. It is intended that the appended claims be construed to include alternate embodiments to the extent permitted by the prior art.

What is claimed is:

1. A method for insuring that when a data resource which is located on a web server and is accessible by a plurality of computer users that each have a web browser but is only useable by one computer user at a time has been allocated to a computer user, the data resource will be made available to other computer users under certain conditions, the method comprising:

first transmitting a temporary identifier to a first computer associated with a first computer user of the plurality of computer users that have the right to access the data resource;

first receiving an initial request for access to the data resource from the first computer associated with the first computer user, said initial request including said temporary identifier;

determining if the data resource is available;

providing, if the data resource is determined to be available, the first computer associated with the first computer user with exclusive access to the data resource for a first predetermined period of time;

second receiving a subsequent request that relates to the data resource from the first computer associated with the first computer user, said subsequent request including said temporary identifier;

second transmitting a reply to said subsequent request if said subsequent request is received within said first predetermined period of time;

releasing the data resource for allocation to any of the plurality of computer users that have the right to access the data resource upon the expiration of said first predetermined period of time if said subsequent request from the first computer associated with the first computer user is the most recent request from the first computer and is not accorded a time that is within a second predetermined period of time, wherein said second predetermined period of time is within said first predetermined period of time and less than said first predetermined period of time; and renewing, if said subsequent request from the first computer associated with the first computer user is the most recent request from the first computer and is accorded a time that is within said second predetermined period of time, exclusive access of the first computer user to the data resource.

2. A method, as claimed in claim 1, wherein:

said second predetermined period of time starts after the start of said first predetermined period of time and ends when first predetermined period of time ends.

3. A method, as claimed in claim 1, wherein:

said step of renewing includes renewing the exclusive access of the first computer user to the data resource for a third predetermined period of time if said subsequent request is accorded a time that is within said second predetermined period of time.

4. A method, as claimed in claim 1, wherein:

said step of renewing includes renewing the exclusive access of the first computer user to the data resource for one or more further predetermined periods of time if a required number of further subsequent requests are accorded times that are within a predetermined extent of one of said further predetermined periods of time; and releasing the data resource for allocation to any of the plurality of users upon the expiration of one of said further predetermined periods of time if said required number of said further subsequent requests are not accorded times that are within said predetermined extent of said one of said further predetermined periods of time.

5. A method, as claimed in claim 4, wherein:

said further predetermined periods of time decrease in length as the number of renewals increases.

6. A method, as claimed in claim 4, wherein:
the number of said further subsequent requests that must occur within said predetermined extent of said one of said further predetermined periods of time to obtain a renewal increases as the number of renewals increases.

7. A method, as claimed in claim 1, wherein:
said step of renewing includes renewing the exclusive access of the first computer user to the data resource for a third predetermined period of time unless a second computer user with a higher priority than said first computer user has been denied access to the data resource during said first predetermined period of time.

8. A method, as claimed in claim 1, wherein:
said step of renewing includes renewing the exclusive access of the first computer user to the data resource for a third predetermined period of time unless a predetermined number of other computer users have been denied access to the data resource during said first predetermined period of time.

9. A method, as claimed in claim 1, wherein:
said second predetermined period of time starts after the start of said first predetermined period of time; and
said step of renewing includes renewing the exclusive access of the first computer user to the data resource for a third predetermined period of time if said subsequent request is accorded a time that is within said second predetermined period of time.

10. A method, as claimed in claim 1, wherein:
said second predetermined period of time starts after the start of said first predetermined period of time and ends when said first predetermined period of time ends; and
said step of second transmitting includes renewing the exclusive access of the first computer user to the data resource for a third predetermined period of time if said subsequent request is accorded a time that is within said second predetermined period of time.

11. In a system that includes a web server with a data resource, a plurality of user computers that are each associated with users which are authorized to access the data resource and each have a web browser, and an Internet/intranet for communicating information between the web server and the plurality of user computers, a method related to insuring that when the data resource is allocated to one user, the data resource will be made available to other users under certain conditions, the method comprising:
first receiving, at the first user computer, a temporary identifier from the web server;
first transmitting, from the first user computer and using a web browser, an initial request for access to the data resource from the first user computer to the web server;
wherein said initial request includes said temporary identifier;
second receiving, at the first user computer and in response to said initial request, exclusive access to the data resource for a first predetermined period of time;
second transmitting, from the first user computer and using the web browser, a subsequent request to the initial request that relates to the data resource from the first user computer to the web server;
wherein said subsequent request includes said temporary identifier;
third receiving, at the first user computer, a reply to said subsequent request if said subsequent request is submitted within said first predetermined period of time;
fourth receiving, at the first user computer, an indication that the data resource has been released for allocation to any of the plurality of user computers if said subsequent request is the most recent request and is not accorded a time that is within a second predetermined period of time, wherein said second predetermined period of time is within said first predetermined period of time and less than said first predetermined period of time; and
fifth receiving, if said subsequent request is the most recent request and is accorded a time that is within said second predetermined period of time, a reply to a further request relating to the data resource that is based upon a renewal of the exclusive access of the first user computer to the data resource.

12. A method, as claimed in claim 11, wherein:
said renewal of the exclusive access of the first user computer to the data resource is for a third predetermined period of time.

13. A method for use in insuring that when a data resource that is located on a web server, accessible by a plurality of user computers that each have a web browser, but can only be allocated to one of the plurality of user computers at a time is allocated to a first user computer, the data resource will be made available to other user computers under certain conditions, the method comprising:
providing an Internet/intranet for conducting communications between a web server and the plurality of user computers;
wherein said Internet/intranet has a server communication port for communicating with the web server;
wherein said Internet/intranet has a user communication port for communicating with the plurality of user computers;
providing, using said user communication port, a temporary identifier to a first user computer;
first receiving, at said user communication port, an initial request for access to the data resource from the first user computer, said initial request including said temporary identifier;
first transmitting, using said server communication port, said initial request to the web server;
second receiving, at said server communication port and in response to said initial request, an indication that the first user computer has exclusive access to the data resource for a first predetermined period of time;
second transmitting, using said user communication port, said indication to said first user computer;
third receiving, at said user communication port, a subsequent request from the first user computer relating to the data resource, said subsequent request includes said temporary identifier;
third transmitting, using the server communication port, said subsequent request to the web server;
fourth receiving, at said server communication port, a reply to said subsequent request if said subsequent request is accorded a time that is within said first predetermined period of time;
fourth transmitting, using said user communication port, said reply to said first user computer;
fifth receiving, at said server communication port, an indication that the data resource was released for allocation to any of the plurality of computer users upon expiration of said first predetermined period of time, said indication resulting because said subsequent request was the most recent request and was not accorded a time that was within a second predetermined period of time, wherein said second predetermined period of time is within said first predetermined period of time and less than said first predetermined period of time;

fifth transmitting, using said user communication port, said indication to the first user computer sixth receiving, if said subsequent request is the most recent request and is accorded a time that is within said second predetermined period of time, a reply to a further request relating to the data resource that is based upon a renewal of the exclusive access of the first user computer to the data resource.

14. A method, as claimed in claim 13, wherein:

said step of sixth receiving occurs during a third predetermined period of time that is continuous with said first predetermined period of time and during which no other user computer is allowed to access the data resource.

15. A method for detecting when an individual's authorization to access a data resource, which is being provided by a web server, is being used by a first individual at a first computer and a second individual at a second computer, with at least one of the first and second individuals not being authorized to access the data resource, the method comprising:

first receiving, at the web server, a first initial request for access to the data resource that is made by the first individual using the first computer and includes the individual's authorization to access the data resource;

first transmitting, from the web server, a first temporary identifier to the first computer associated with the first individual, said first temporary identifier for use by said first computer in subsequent communications with the web server;

second receiving, at the web server, a second initial request for access to the data resource that is made by the second individual using the second computer and also includes the individual's authorization to access the data resource;

second transmitting, from the web server, a second temporary identifier to the second computer associated with the second individual, said second temporary identifier for use by the second computer in subsequent communications with the web server;

identifying, in said subsequent communications from the first and second computers that include said first and second temporary identifiers, a pattern in times associated with the first and second temporary identifiers that is indicative of at least one of the first and second individuals not being authorized to access the data resource;

wherein said step of identifying includes defining a first period of time that extends between first and second times that are associated with two consecutive occurrences of said first temporary identifier, defining a third time that is associated with an occurrence of said second temporary identifier, first determining, when said third time occurs between said first and second times, an overlap time period that extends from said third time to said second time, second determining if said overlap time period is less than a predetermined period of time and thereby indicative of an unauthorized access of the data resource, or if said overlap time period is equal to or greater than said predetermined period of time and thereby indicative of an acceptable and possible simultaneous access of the data resource.

16. A method, as claimed in claim 15, wherein:

said step of determining includes determining if at least a portion of second period of time does not overlap said first period of time.

17. A method for detecting when an individual's authorization to access a data resource, which is being provided by a web server, is being used by a first individual at a first computer and a second individual at a second computer, with at least one of the first and second individuals not being authorized to access the data resource, the method comprising:

first receiving, at the web server, a first initial request for access to the data resource that is made by the first individual using the first computer and includes the individual's authorization to access the data resource;

first transmitting, from the web server, a first temporary identifier to the first computer associated with the first individual, said first temporary identifier for use by said first computer in subsequent communications with the web server;

second receiving, at the web server, a second initial request for access to the data resource that is made by the second individual using the second computer and also includes the individual's authorization to access the data resource;

second transmitting from the web server, a second temporary identifier to the second computer associated with the second individual, said second temporary identifier for use by the second computer in subsequent communications with the web server;

identifying, in said subsequent communications from the first and second computers that include said first and second temporary identifiers, a pattern in times associated with the first and second temporary identifiers that is indicative of at least one of the first and second individuals not being authorized to access the data resource;

wherein said step of identifying comprises first defining a first period of time based upon the times associated with two occurrences of said first temporary identifier, second defining a second period of time based upon the times associated with two of said second temporary identifier, and determining if said second period of time overlaps with said first period of time, wherein said overlap extends for a period of time that is less than a predetermined period of time;

providing said web server with positional information on the first and second computers; and using said positional information to determine a travel time for an individual to move between the locations of the first and second computers; and employing said travel time to establish said predetermined period of time.

* * * * *